Feb. 2, 1937.  B. BEARDSLEY ET AL  2,069,716
DRAG CONVEYER SYSTEM
Filed Sept. 16, 1931   2 Sheets-Sheet 1
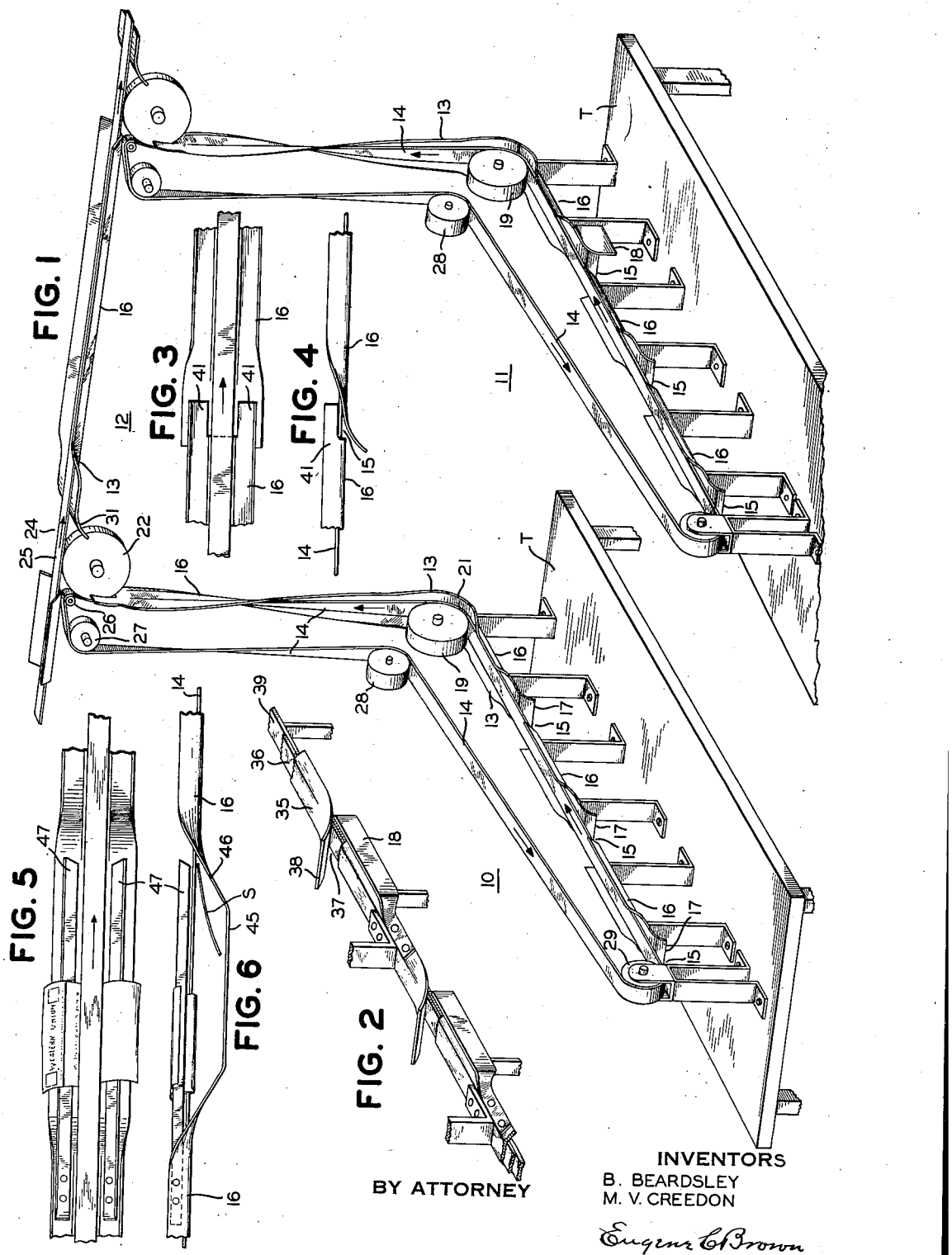
INVENTORS
B. BEARDSLEY
M. V. CREEDON
BY ATTORNEY

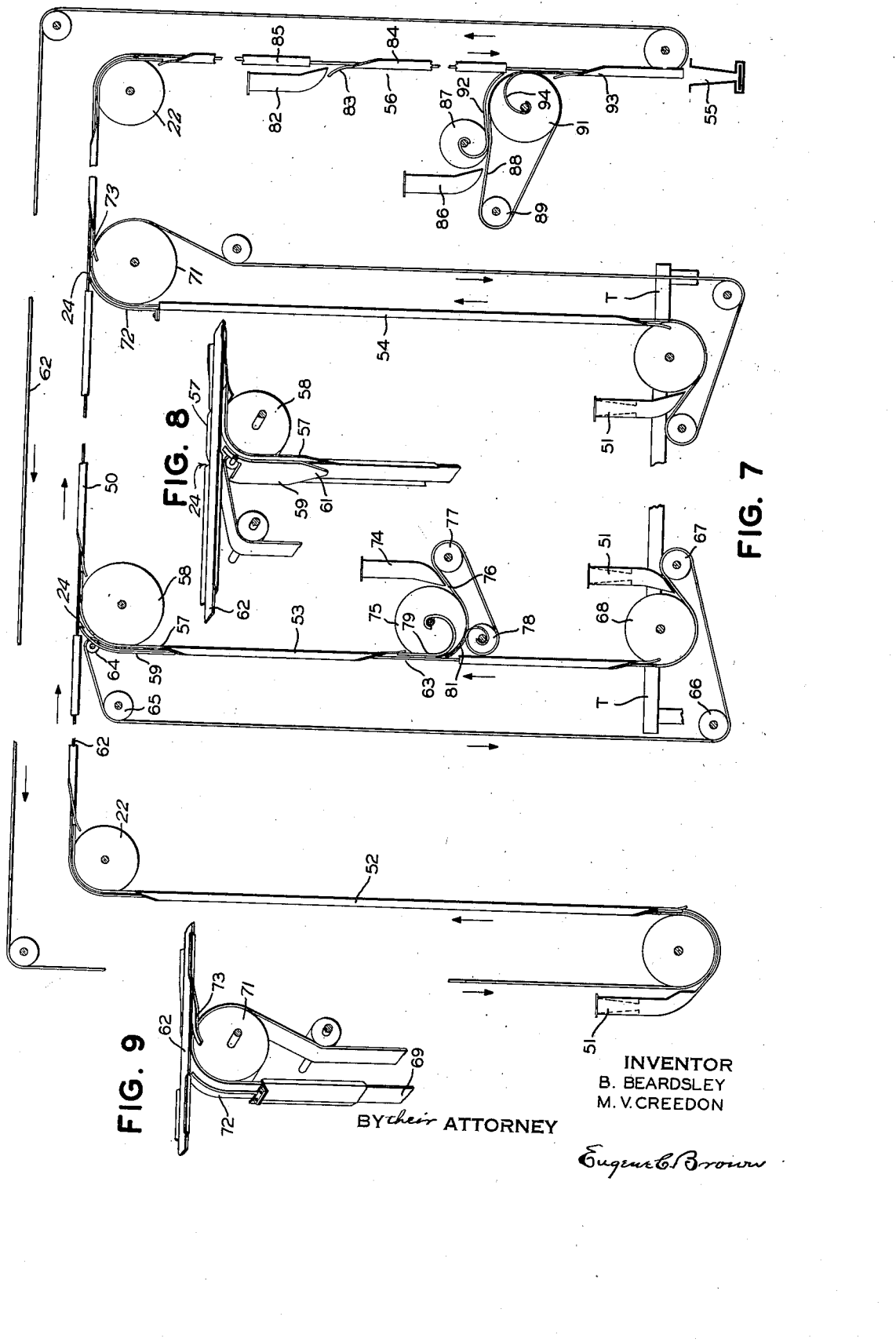

Patented Feb. 2, 1937

2,069,716

UNITED STATES PATENT OFFICE

2,069,716

DRAG CONVEYER SYSTEM

Bruce Beardsley, Brooklyn, N. Y., and Michael V. Creedon, Westfield, N. J., assignors to The Western Union Telegraph Company, New York, N. Y., a corporation of New York Application September 16, 1931, Serial No. 563,194

26 Claims. (Cl. 198—160)

This invention relates to conveyer systems for transporting sheet material such as telegram blanks, letters, messages and the like, and more particularly to systems including drag conveyers, and has for an object to provide for admitting or feeding material into drag conveyers at intermediate points along a section of the conveyer as well as at the end thereof.

This invention is applicable to any type of drag conveyer system having a stationary conveyer member or support with a conveyer belt traveling along the support for conveying sheet material between the belt and support by frictional engagement with the belt. However, it is particularly applicable to the type conveyer system described and claimed in Patent No. 1,793,953, entitled Drag conveyer, and granted February 24, 1931, to F. E. d'Humy, et al, which system embodies a conveyer channel of substantially less width than the width of the message or sheet to be conveyed, the channel being formed with a flat bottom portion and upwardly flaring side walls. A narrow belt is arranged to travel along the bottom portion of the channel for conveying sheet material held between the channel and the belt in a non-planiform shape.

The conveyer system as described in the aforementioned patent may comprise any number of different parts or sections cooperating with each other and extending in any desired horizontal, vertical or inclined direction. The sections are suitably joined together, usually with the same belt continuing through a number of sections and arranged so that the material travels from section to section until it reaches the discharge end of the conveyer system. The material to be conveyed is introduced or fed into the conveyer through inlets provided at the ends of several of the sections. However, as heretofore arranged, the inlet positions in the conveyer have been located only at the end of one or more of the sections.

Therefore, it is a more particular object of our invention to provide, in a conveyer system of the character described, one or more inlets or feed-in openings located at any desired position along the length of a conveyer section. A conveyer section is to be taken to mean the portion of the conveyer, including the belt and the channel, extending between two belt-direction-changing or return rollers.

Another object is to provide inlets or feed-in openings in the nature of slots or cut away portions in the channel which will permit the sheets to be fed into the conveyer between the belt and the conveyer channel, either by hand or by mechanical means.

Another object of this invention is to provide a belt and conveyer channel arrangement which will permit the sheets to be fed in to the conveyer from either above or below the conveyer channel.

Still another object is to provide guide means adjacent the sides of the conveyer inlets which will guide the sheets into proper position, as they are inserted through the inlets into the conveyer.

A further object is to provide means to direct the sheets across the intermediate conveyer inlets.

A still further object of this invention is to provide mechanism for transferring sheet material from a delivery conveyer into a section of a drag conveyer intermediate its terminals. In this connection a "delivery conveyer" is to be understood as meaning a conveyer arranged to deliver or discharge material at its terminus in such a manner that it may be received through the inlet of a second conveyer suitably arranged adjacent the terminus.

These and other objects are effected by our invention, as will be apparent from the following description and claims taken in connection with the accompanying drawings, forming a part of this application, in which:

Fig. 1 is a perspective view of a conveyer system showing branch and trunk conveyers with feed-in slots in the conveyer channels;

Fig. 2 is a fragmentary detailed perspective view showing the conveyer belt and channel so arranged as to provide for feeding material downward from above;

Fig. 3 is a plan view of a feed-in slot with overlapping parts;

Fig.4 is a side elevation of Fig. 3;

Fig. 5 is a plan view showing the channel member bent downward in the form of a loop to provide the feed-in opening;

Fig. 6 is a view in side elevation of Fig. 5;

Fig. 7 shows another form of conveyer serving as a branch conveyer and feeding into the trunk run of the conveyer system; and, Figs. 8 and 9 are detail perspective views of the transfer arrangement between two drag conveyers.

According to this invention a drag conveyer section provided with a plurality of inlets may be used as a pick-up conveyer, instead of open type conveyers such as the V-trough type shown and described in Patent No. 1,780,118, granted October 28, 1930 to F. E. d'Humy. The inlets or feed-in slots may be spaced at any desired distance apart. The spacing may be close enough that for all practical purposes the material may be fed into the conveyer from substantially any position along its length as readily as into the open type conveyers shown in the above mentioned patent. In addition, according to this invention, the pick-up conveyer sections of the drag type may be arranged to feed directly into a trunk run of a drag type of conveyer by providing feed-in slots or openings in the conveyer channel of the trunk run and a suitable discharge for the pick-up sections arranged to deliver or feed the message blanks or other sheet material in the trunk conveyer through the feed-in openings.

Referring now to the drawings, Fig. 1 shows a conveyer system arranged in accordance with this invention, comprising a plurality of branch conveyers arranged to feed into a common trunk conveyer. For the purposes of illustration, two branch conveyers 10 and 11 are shown as delivery conveyers feeding into an overhead trunk conveyer 12. The conveyers illustrated are of the drag type and comprise, briefly, conveyer channel members 13 of relatively less width than the average width of the sheets of material to be conveyed and formed with a bottom portion upon which a conveyer belt 14 travels and which carries upwardly flaring side portions. The material is transported along the channel members 13 between them and the belt 14 by frictional engagement with the belt. The upwardly flaring side portions of the channel serve to urge the sheets toward the belt and maintain them in non-planiform shape, which has been found the most effective manner of retaining the sheets in proper position in the conveyer and of maintaining the same in continuous engagement with the belt. It has been found that conveyers of this type can be operated at relatively high speeds and for this reason can handle considerably more material with less time lag than other types of conveyers.

Each of the branch conveyers, as shown in Fig. 1, embodies a horizontal collecting section which may be disposed along the center of a table T, or arranged at the back of a row of operators' desks, tables or cabinets, or in any other conveniently accessible position, and which is provided with a plurality of slots or openings 15 in the intermediate portion of the horizontal channel sections. These openings are arranged to constitute inlet or feed-in slots through which the message blanks or other sheet material to be collected may be fed into the conveyer.

In this embodiment the feed-in slots or openings 15 are formed by entirely severing the channel 13 at each slot thereby dividing the channel into a plurality of sections 16. In other words, the portion of the channel embodying the feed-in slots might be considered as being made up of a plurality of sections 16 arranged end to end. The entrance end of each of the channel sections forming one side of the feed-in slots or openings is flattened out and declined away from the belt to form lips 17 so that a telegram blank or message or other material to be conveyed may be inserted by hand between the conveyer channel and the moving belt. The sheet material is thus brought into frictional contact with the moving belt which engages the same and carries it forward along the channel.

As already indicated, the type of conveyer channel employed is of less width than the width of the message blank or other sheet material to be conveyed so that the sides of the sheet overhang the channel as it travels therealong. With this arrangement it is desirable that the sheets be inserted into the conveyers so that they will be engaged by the conveyer belt substantially along their midportion. This means that the operator must insert the sheets into the conveyer so that substantially equal amounts extend out over either side of the channel. It has been found that the sheets may be readily inserted in the required manner by providing a stop or guide member, such as a plate or bar 18 or 18', as shown in Figs. 1 and 2, adjacent the entrance portion of the feed-in slot in such a manner that it will serve as a transverse stop for the fingers of the operator, as the message is carried forward across the conveyer channel. As the message is normally gripped between the fingers of the operator and fed transversely across the inlet, it will be properly spaced with respect to the channel and engaging belt when the fingers of the operator have come against the stop member.

In order that the material may be conveyed across the feed-in slots or openings from forward sections of the conveyer, the spaces across the feed-in openings or between sections of the conveyer channel are so arranged that the portion of the belt out of contact with the channel is equal to or preferably less than the average width of the sheet material to be conveyed. When arranged in this manner, a sheet leaving one section of the channel will span the opening and be engaged between the belt and the other section before it has entirely passed out of the preceding section. In this manner, a telegram blank or other sheet material inserted into the feed-in slot between any of the forward sections of the conveyer channel will be conveyed along the channel from section to section practically as if there were no feed-in openings in the channel.

When the sheets or messages which are picked up in the horizontal collecting section of the conveyer reach the end of the collecting section they will be taken around the belt guide roller 19 and the curved portion 21 of the guide channel and proceed upward along the vertical or upright pick-up section of the conveyer to the discharge roller 22. It will be observed that the upright section of the guide channel is twisted through a suitable angle to bring the upper end thereof in line with the horizontal trunk conveyer 12. The trunk conveyer is also of the drag type and preferably embodies a similar conveyer channel and belt to that used in the branch collecting and pick-up sections. The trunk conveyer is arranged to receive the material discharged from the upright section of the branch conveyer through a feed-in slot or discontinuation of the channel as shown at 24. This slot or opening between the channel sections is ordinarily relatively wider than the slots in the collecting section of the branch conveyers and preferably are of a width sufficient to permit the discharge roller 22 to be arranged therin so as to engage the belt 25 of the trunk conveyer as it passes over the opening. The belt at the delivery end of the pick-up section of the branch conveyer is arranged to be held in contact with the discharge roller 22 by being passed around a small roller 26 disposed well up toward the belt 25 as it appears in the opening 24. From the roller 26 the branch conveyer belt passes around another roller 27 and down around suitable rollers 28 and 29 to the horizontal collecting section of the branch conveyer.

In the transfer of the message blanks from the branch conveyer to the trunk conveyer, they are fed from the delivery end of the upright channel section 16 between the belt 14 and the roller 22 and discharged therefrom upwardly toward the traveling belt 25. As the upper edge of the message blank engages the belt 25 it will be carried forward and brought between the belt and the upper portion of the roller 22 and thence between the depending lip 31 of the feed-in opening and the belt 25, whereupon it is carried along the conveyer channel in the usual manner.

The collecting portion of the branch conveyers are each shown as being mounted on separate tables. In use, these tables might be the operating tables at which messages are received in a telegraph office by telegraph or telephone and where they are transcribed by the operators and transferred to some other point in the building from which they are dispatched over the proper communication channel. The operators after transcribing the messages on a suitable blank or sheet of material will reach forward and insert the message into the nearest slot or opening in the conveyer channel of the collecting conveyer. This is done by holding the message in the hand and passing it across the feed-in opening until the fingers engage the stop or guard plate 18 or until the message is properly centered with respect to the conveyer belt. It is then passed up the inclined portion 17 of the entrance side of the slot until it has been engaged by the traveling belt and taken from the hand of the operator.

In Fig. 2 another form of my invention is illustrated. In this form the channel of the following conveyer is disposed in an inverted position, or in other words, so that the conveyer channel is above the belt and the flared side portions extend in a downward direction. This arrangement embodies channel sections 35 disposed in an inverted position over a traveling conveyer belt 36. Feed-in openings 37 are formed between the ends of the adjacent channel sections, by raising a portion of the channel section at one side of the slot away from the traveling belt and flattening the channel section out to form lips 38. The ends of the adjacent channel sections may be arranged in overlapping relation so as to shorten the space which the message blanks, arriving from forward sections of the conveyer, must span. In the inverted arrangement the conveyer belt is held in place by a longitudinally extending supporting member 39 which may comprise a strip substantially of the same width as the belt. Adjacent the feed-in openings, stop or guide plates 18' may be provided for assisting the proper spacing of the message blanks as they are inserted into the conveyer.

When the inverted type of conveyer is employed the message blanks are inserted into the conveyer from above the conveyer belt instead of from below as in the foregoing embodiment. The operator merely places the message across the back of the conveyer channel and carries it forward along the channel with the fingers engaging the stop bar 18' until the forward edge of the message blank is engaged between the traveling belt and the conveyer channel. This provides a form of feed-in which may be easily reached with a minimum of effort by the operators.

When narrow sheets of material are to be handled by the collecting conveyer which would likely drop out in crossing the feed-in openings or when any other type of material is to be handled which would not readily span a feed-in opening of an appreciable width, an arrangement such as shown in Figs. 3 and 4 may be employed. In this arrangement, the adjacent ends of the conveyer sections 16 are disposed in overlapping relation. The forward conveyer channel section is recessed underneath the belt, or in other words, the bottom or flat portion of the conveyer channel is cut away so that the sides 41 remain and project forward. The sections are then overlapped so that the side portions extend preferably up to or beyond the point where the conveyer belt engages the bottom of the succeeding section. In this manner, the material being conveyed across the feed-in opening is supported by its margins in the forward section of the conveyer until it has been engaged between the belt and the conveyer channel in its succeeding section. The entrance end of the succeeding conveyer section is flattened out underneath the forwardly extending side portions 41 and arranged to provide a clearance space between the lower edge of the forwarding projecting sections so that sheet material being conveyed in through the feed-in opening 15 may readily pass into the succeeding section as it is engaged by the conveyer belt.

Under certain circumstances, the conveyer channel in the collecting conveyers or collecting sections of the branch conveyers may be more readily secured to a suitable support if the feed-in openings could be provided without severing or cutting the channel member into sections. Figs. 5 and 6 illustrate feed-in openings formed in the conveyer channel without cutting the channel sections. In this arrangement, the conveyer channel adjacent the position of the feed-in slot is flattened out along a suitable portion of its length and bent out so as to be spaced away from the belt for a small distance. The spaced portion of the channel should preferably be of somewhat greater length than the width of the sheet material to be fed into the conveyer. With the flat portion 45 of the channel 16 spaced away from the belt, message blanks or other sheet material S may be fed into the conveyer between the conveyer belt 14 and moved along the inclined portion 46 of the spaced section, until they are engaged by the traveling belt which will carry them forward along the conveyer channel.

With a feed-in opening formed as just described there will be a substantial portion of the belt out of engagement with the conveyer channel as it passes across the opening. The dropping out of material coming from a forward section of the conveyer is obviated by providing strips or bars 47, secured to the outwardly flaring sides of the forward portion of the conveyer channel 16 and extending across the opening substantially the full length thereof. As sheets of material arrive at the opening from forward sections of the conveyer they ride up on the bars 47 and are carried across the opening to where they are engaged by the belt at the other side of the same. The bars 47 are terminated at the other side of the opening a sufficient distance from the normal section of the conveyer to provide space for feeding material into the conveyer. The bars 47 may be considered as a continuation of the conveyer channel substantially the full distance across the flattened section of the conveyer. It will be observed, that the bars extend from the upwardly flaring side portions and are held slightly above the portion of the belt traveling across the opening, and that the belt travels free of the bars so that it is exposed across the feed-in opening. This arrangement enables the message blanks to be more easily engaged by the belt as they are moved along the opening to the entrance end of the succeeding portion of the conveyer. However, in a further modification a section of conveyer channel properly set in place, or other suitable means, might be employed instead of the spanning bars 47 to carry the material across the opening.

As hereinbefore set forth, feed-in openings or inlets arranged according to this invention may be employed in the construction of improved forms of conveyer systems. One such system is illustrated in Fig. 7. This system embodies trunk conveyer 50 disposed transversely across the upper ends of a series of pick-up conveyers 52, 53 and 54 of the drag type. These receive material from a corresponding number of collecting conveyers 51. The collecting conveyers may be arranged along separate operating tables T, such as illustrated in Fig. 1 or otherwise disposed at a suitable height from the floor to receive material to be transported over the conveyer system. The collecting conveyers are ordinarily located in parallel rows and arranged to discharge the material collected therein at one end of the row of conveyers. Heretofore these conveyors have been arranged to deliver to a trunk pick-up conveyer arranged along the floor across the ends of the collecting conveyers. With this arrangement, one end of the conveyer group was closed to passage of operators or attendants by the transversely arranged pick-up conveyer. By employing this invention each of the collecting conveyers may be arranged to deliver to separate upwardly extending pick-up sections 52, 53 and 54 which in turn feed into the trunk conveyer 50, located at a suitable height to permit passage thereunder. Ordinarily, the trunk conveyer would be disposed along the ceiling of the room. By employing feed openings 24 with a suitable discharge arrangement for the pick-up sections, as hereinbefore described in connection with Fig. 1, the pick-up sections feed directly into the trunk conveyer channel. In this manner each of the collecting conveyers is arranged to connect with the transversely extending trunk conveyer arranged overhead instead of across the ends of the collecting conveyers. After receiving material from the collecting conveyers it is transported to a suitable discharge point which is here represented by a V-trough conveyer 55 at the end of a downwardly extending discharge section 56.

With regard to the delivery or discharge arrangement the vertical sections, it will be noted that the belt for section 53 is disposed at the left of the messages and for section 54, the belt is to the right of the messages. Each of these pick-up sections, therefore, require a somewhat different mechanism for transferring the sheet material into the trunk conveyer 50. That used with section 53 is shown in detail in Figure 8 and is substantially the same as shown in Figure 1 excepting that the flanges 57 of the vertical trough are straightened into the plane of the belt and bent completely around the roller 58. A guide plate 59 is disposed parallel to the flanges 57 and spaced therefrom. Its lower end 61 is tapered towards the center of the belt and its upper end forked for the passage of the belt, whereby the sheet material will be definitely guided, at its margins, around the roller 58 into the junction of this roller and the trunk belt 62 and into the trunk channel. The upright belt 63 extends about the rollers 64 and 65, returning by rollers 66, 67 and 68 to the lower end of the vertical riser.

The transfer arrangement of riser 54 is shown in detail in Figure 9. The vertical belt 69 passes directly around the roller 71, in contact with the trunk belt 62, the vertical trough section terminating at the side of the roller and the sheets being held in contact with the belt 69 until they pass into the junction of the two belts by a curved strap 72. The inlet section of the trunk trough 73 is forked and the side flange curved downwardly along the sides of the roller 71 to guide the sheets into the trough.

We have also shown an intermediate feed-in for the riser 53 comprising a chute 74, which may be fed by hand or from another conveyer, discharging into the junction of a roller 75 and an auxiliary endless belt 76, passing around rollers 77 and 78. The vertical drag channel is broken opposite the roller and a pair of curved guide bars 79, one on each side of the roller 75, is substituted for engaging the margins of the blanks or sheets and holding them against the belt, across the break of the conveyer channel. A pair of auxiliary curved guide bars 81 are also provided, one on each side of the roller 78 to strip the sheet material from the belt 76, as it leaves the surface of the roller 75 and to guide the sheet into contact with the vertical belt 63. The sheet is carried along the guide bars 79 into the upper portion of the vertical channel.

In connection with the downward or discharge section 56 of the system we have shown two types of feed-ins. The upper one comprises a plain chute 82 discharging into the outwardly curved lip 83 of the vertical channel member 84. The preceding vertical channel section 85 terminates slightly in advance of the lip 83 or may overlap the same, as in Figures 3 and 4.

The lower feed-in comprises a chute 86 feeding into the junction of a roller 87 a belt 88, passing around rollers 89 and 91. The sheets are held in contact with the belt 88, by guide bars 92, one on each side of the roller 87, which engage the margins of the sheets, and they are stripped from the belt 88 and guided into the lower conveyer section 93 by guide bars 94.

From the foregoing description, the operation of the conveyer system will be readily understood. It will be observed, that we have provided a drag type of conveyer with means to feed material into the conveyer channel at any desirable number of points along the channel. Also it will be observed that such feed-in openings may be provided at substantially any point along any section of the conveyer, whether the section be employed as a collecting conveyer, as a vertical pick-up conveyer or as the main or trunk run of the conveyer. It will be observed further that the feed-in openings in the conveyer channel may be arranged to accommodate material being fed in either by hand or by mechanical means such as the discharge of another conveyer.

While we have shown our invention in a number of forms, it will be obvious to those skilled in the art that it is not limited to these forms but it is susceptible to various other changes and modifications without departing from the spirit thereof, and we desire, therefore, that only such limitations shall be placed thereon as are imposed by the art or as are specifically set forth in the appended claims.

What we claim is:

1. A drag conveyer comprising a longitudinally extending stationary support and a belt adapted to travel on said support for conveying sheet material between the belt and the support by frictional engagement with the belt, said support being arranged at one or more points along its intermediate portion to discontinue for a space its engagement with the belt to enable sheet material to be fed into the conveyer between the belt and the support.

2. A drag conveyer comprising an endless belt and a single conveyer member in contact with which the belt travels and forming therewith a single channel along which sheet material is conveyed by frictional engagement with the belt, said conveyer member having portions spaced away from the belt at one or more points intermediate its ends to provide for admitting into said channel the material to be conveyed.

3. A drag conveyer comprising a conveyer channel and a belt arranged to travel therein, said conveyer channel having portions suitably spaced away from the belt at one or more points for forming feed-in openings to provide for admitting material to be conveyed into the conveyer channel and underneath the belt, and means disposed in the opening for supporting the material carried across the openings from other parts of the conveyer.

4. In a drag conveyer, the combination of a conveyer channel comprising a line of stationary longitudinally extending channel sections arranged end to end and a belt arranged to travel along said channel sections for conveying sheet material by frictional engagement with the belt, said channel sections being arranged with their ends spaced apart to provide for the insertion of sheet material between the belt and the channel section in position to be conveyed.

5. In combination, a drag conveyer comprising a longitudinally extending stationary support and a conveyer belt adapted to travel in frictional engagement with the support, said support being provided intermediate its ends with one or more openings for admitting sheet material between the belt and support so as to be conveyed along the support, and mechanical means for gripping sheet material and positively feeding the same into the conveyer through the openings.

6. The combination of a drag conveyer comprising a belt support and a conveyer belt adapted to travel on said support, a longitudinally extending conveyer channel disposed in inverted relation over said belt for conveying sheet material by frictional engagement with the belt, said channel having portions disposed out of contact with the engaging face of the belt at one or more points along its length and shaped to form openings for admitting sheet material into the conveyer against the belt, as it travels along said support.

7. In a conveyer system, the combination of a drag conveyer comprising a longitudinally extending support and a conveyer belt adapted to travel along said support for conveying sheet material by frictional engagement with the belt, said support being provided, at one or more points along its length, with a sloping section extending in the direction of the approach of the belt and inclined away from the engaging face of the belt, said support having a feed-in opening formed therein adjacent to each inclined section for admitting sheet material into the conveyer against the traveling belt, a roller disposed in said opening and arranged to rotate in contact with the engaging face of the belt, and a feeding conveyer arranged to discharge material between the roller and the belt.

8. In a conveyer system, the combination of a plurality of branch conveyers for transporting sheet material, each branch conveyer having a delivery end, and a trunk conveyer of the drag type arranged to receive the material from each of the branch conveyers, said trunk conveyer comprising a belt and a stationary channel along which the belt travels, the delivery ends of the branch conveyers being disposed transversely to the channel at spaced points therealong and arranged to positively discharge sheets therefrom, said channel being cut away adjacent the discharge ends of the branch conveyers for forming inlets through which material is thrust as it is discharged from the branch conveyers.

9. In a conveyer system a combination of conveyers of the drag type comprising a conveyer channel and a belt arranged to travel along said channel for conveying sheet material by frictional engagement with the belt a common collecting conveyer and a plurality of feeding conveyers having discharge ends arranged to feed positively into the common conveyer at spaced points along a portion of its length, said feeding conveyers including a horizontal section having a sectionalized channel slotted for admitting material at a plurality of points therealong, said common conveyer having feed-in openings formed in the channel adjacent the discharge ends of the feed conveyers, and means at the delivery ends of the feeding conveyers for discharging the material therefrom between the belt and the channel of the common conveyer.

10. A drag conveyer comprising a longitudinally extending conveyer channel and a belt adapted to travel along said channel for conveying sheet material between the belt and the channel by frictional engagement with the belt, said channel comprising sections disposed with their ends in overlapping relation, one of said sections being inclined away from the belt and spaced transversely from the end of the other section to provide a feed-in passageway between adjacent channel sections.

11. A drag conveyer comprising a longitudinally extending conveyer channel and a belt adapted to travel along said channel for conveying sheet material between the belt and the channel by frictional engagement with the belt, said channel comprising sections disposed with their ends in overlapping relation, one of said sections being inclined away from the belt, the other of said sections having the adjacent bottom of its overlapping portion cut away, said channel sections cooperating to form a feed-in passageway between their overlapping ends for feeding sheet material into the conveyer.

12. In a material collecting system, the combination of a plurality of rows of horizontal feed conveyers, each comprising contacting conveyer elements arranged to carry material therebetween, each of said conveyers having vertical runs at one end thereof twisted so as to discharge transversely to the horizontal portion and a common collecting conveyer adjacent the discharge ends of said vertical runs and arranged to receive material therefrom.

13. In a conveyer system, a conveyer comprising a longitudinally extending support and a belt adapted to travel in contact therewith, for conveying sheet material between the belt and support, said support being discontinuous between its ends to form spaced sections, and a roller disposed between said spaced sections in contact with said belt, whereby sheet material may be inserted into the conveyer at the junction of the belt and roller.

14. In a drag conveyer for sheet material, the combination of a continuous conveyer support member, a belt arranged to travel along said member for forming a single channel along which sheet material is conveyed between the support and the belt, said support member, at one or more points along its intermediate portion, being bent away from said belt so as to form a loop embodying an opening through which material may be fed into said channel.

15. In a drag conveyer for sheet material, the combination of a continuous conveyer support member, a belt arranged to travel along said member for forming a single channel along which sheet material is conveyed between the support and the belt, a portion of said support member, at one or more points along its intermediate portion, being bent away from said belt so as to form a loop embodying an opening through which material may be fed into said channel, and another portion of said support being disposed in the opening to support material from forward portions of the conveyer as it passes over said opening.

16. In a conveyer for sheet material a first conveyer member, a belt adapted to travel in contact therewith for providing a channel along which sheet material is conveyed between the belt and conveyer member, said conveyer member at an intermediate portion thereof being formed so that its contact with the belt is discontinued for a space to provide an opening for feeding sheet material into said channel, a second conveyer arranged to discharge material into said opening, and a roller disposed in said space and arranged to engage the belt for forming a pair of moving elements to grip the sheets entering said opening either as it arrives from forward portions of the first conveyer or as fed from the second conveyer and push them across the opening.

17. In a drag belt conveyer system for conveying sheets, a laterally running drag belt pick-up line comprising a belt having a conveyer reach trained with its conveyer face directed downward, and a longitudinal sheet guide opposed to said face to hold sheets thereto for drag conveyance along said guide and having a gap at an intermediate point in the line for entry of sheets therethrough to said belt reach; a drag conveyer belt line ascending toward the pick-up line and comprising a pulley at the lower end of the line, a belt trained around the under side of said pulley to form an ascending conveyer reach and a lateral sheet-receiving reach leading to said ascending reach around the under side of said pulley, and a longitudinal sheet guide extending upward from said pulley and opposed to the ascending reach to hold sheets thereto for drag conveyance, a juncture sheet guide extending between the upper end of said guide of the ascending line and the entrance gap of the pick-up line guide and disposed obliquely in the conveying direction of the pick-up line; and means training the ascending belt reach into cooperating relation to said oblique juncture guide to deliver sheets from the feed line through said gap to the pick-up line.

18. A belt conveyer system including a drag belt pick-up line comprising a conveyer belt reach and an opposed longitudinal guide to hold conveyed articles against the belt reach for drag conveyance along said guide, the guide having a feed gap at an intermediate point in the line for entry of articles to said belt reach; a belt conveyer feed line leading toward said pick-up line; and a drag felt delivery juncture between the said feed line and pick-up line, comprising a belt reach trained toward said feed gap obliquely to the pick-up line and inclined in the conveying direction of the latter, and a similarly inclined article guide opposed to said juncture belt reach and extending therealong in frictional engagement therewith to cooperate with it for drag conveyance of articles along said inclined guide from the feed line to said feed gap.

19. In a drag conveyer for sheet material, a stationary support, a belt disposed to travel along said stationary support, said support embodying flexion means for holding sheets transversely flexed as they travel, said support being provided at one or more intermediate points with entrance gaps, said support at the entrance side of said gaps being devoid of flexion means so that sheets substantially straight in transverse form may be fed in at the gaps and engaged by the belt before being flexed.

20. In a drag conveyer for sheet material, a stationary support, a belt disposed to travel along said stationary support, said support being non-planiform transversely thereof to provide flexion means for holding the sheets transversely flexed as they travel, said support being provided at one or more intermediate points with entrance gaps, said support at the entrance side of said gaps being substantially planiform so that substantially flat sheets may enter the conveyer at the gaps.

21. In a drag conveyer for sheet material, a stationary support, a belt disposed to travel along said stationary support, said support being non-paniform transversely thereof to provide flexion means for holding sheets flexed as they travel, said support being provided at one or more intermediate points with entrance gaps, a portion of the support at the entrance side of said gaps being substantially planiform and inclined downwardly to form a depending lip, angularly disposed with respect to the remaining portion of the support, whereby sheets substantially straight in transverse section may be fed upwardly at an angle to the line of travel of said conveyer and flexed in longitudinal section to effect a change in their direction of travel before entering the portion of the conveyer which flexes the sheets in transverse section.

22. In a drag conveyer system for sheet material, a laterally running pick-up line and an upwardly running feed line leading toward an intermediate point of said pick-up line, each conveyer line comprising a stationary support and a belt disposed to travel along said stationary support, said support being formed to embody flexion means holding the sheets flexed in transverse section as they travel along the line, the support of said pick-up line being provided at said intermediate point with an entrance gap for admitting sheets from the feed line to the pick-up line, said feed line being connected to the pick-up line at the gap by a transfer section embodying a substantially flat support member devoid of flexion means so that the sheets may assume a substantially straight transverse section as they pass from the former line to the latter.

23. In a drag conveyer system for sheet material, a laterally running pick-up line and an upwardly running feed line leading toward an intermediate point of said pick-up line, each line comprising a longitudinally extending support and a belt adapted to travel in sliding contact with said support for conveying sheet material between the belt and the support by frictional engagement with the belt, said support in each line being so shaped as to provide flexion means to coact with said belt for holding the sheets in non-planiform shape transversely of the support, the support of the pick-up line being provided with a gap at said intermediate point and adjacent to which the feed line terminates in position to discharge sheets into said gap in a direction angularly disposed to said pick-up line, a lateral portion of the support at the entrance side of said gap and, likewise, a portion of the feed line support at its terminus being flat and devoid of flexion means therealong so that a sheet being transferred from the feed line to the pick-up line may straighten out transversely and flex longitudinally of the support as it changes its direction of travel in passing from the terminus of the feed line into the pick-up line.

24. In a drag conveyer system for sheet material, a laterally running pick-up line and an upwardly running feed line leading toward an intermediate point of said pick-up line, each line comprising a longitudinally extending support and a belt adapted to travel in sliding contact with said support for conveying sheet material between the belt and the support by frictional engagement with the belt, said support in each line being so shaped as to provide flexion means to coact with said belt for holding the sheets in non-planiform shape transversely of the support, the support of the pick-up line being provided with a gap at said intermediate point for admitting sheets to the pick-up line, said feed line being connected to said pick-up line at the gap by a transfer section formed to flex the sheets longitudinally to provide for change in their direction of travel in passing from one line to the other, said transfer section embodying guide members substantially flat in transverse section so that the sheets upon entering the transfer section may flatten out transversely before flexing longitudinally of the support.

25. In a drag conveyer system for sheet material, a laterally running pick-up line and an upwardly running feed line leading toward an intermediate point of said pick-up line, each line comprising a longitudinally extending support and a belt adapted to travel in sliding contact with said support for conveying sheet material between the belt and the support by frictional engagement with the belt, said support in each line being so shaped as to provide flexion means to coact with said belt for holding the sheets in non-planiform shape transversely of the support, the support of the pick-up line being provided with a gap at said intermediate point and adjacent to which the feed line terminates in position to discharge sheets for entering said gap, a roller at the terminus of the feed line for changing the direction of the belt travel and a section of the feed line support being arranged to extend beyond said roller toward the support of the pick-up line, said extended section being substantially flat transversely and having disposed in opposite relation thereto a substantially flat guide member, said section and guide member being devoid of flexion means and pointing guides between which the sheets may straighten out transversely thereof to permit free flexion longitudinally of the guides as the sheets approach the pick-up line.

26. In a drag conveyer system for sheet material, a pick-up conveyer comprising a longitudinally extending support and a belt adapted to travel on said support in frictional contact therewith for conveying sheet material between the belt and support by frictional engagement with the belt, said support being so shaped as to cause the sheet material to assume a non-planiform shape transversely of the support, said support being discontinued at a point along an intermediate portion thereof for forming a gap to provide a feed-in opening, a section of said support at the side of the opening toward which the belt is traveling being devoid of flexion means for permitting sheets in planiform shape to enter said gap and become engaged by said belt before assuming a non-planiform shape, and belt conveyer means for feeding sheets held in planiform shape into said opening.

BRUCE BEARDSLEY.
MICHAEL V. CREEDON.